Nov. 15, 1966   V. T. LEGGE   3,285,348
CUTTING MACHINES, MORE PARTICULARLY
FOR TRIMMING THE EDGES OF LAWNS
Filed Aug. 24, 1964   7 Sheets-Sheet 6

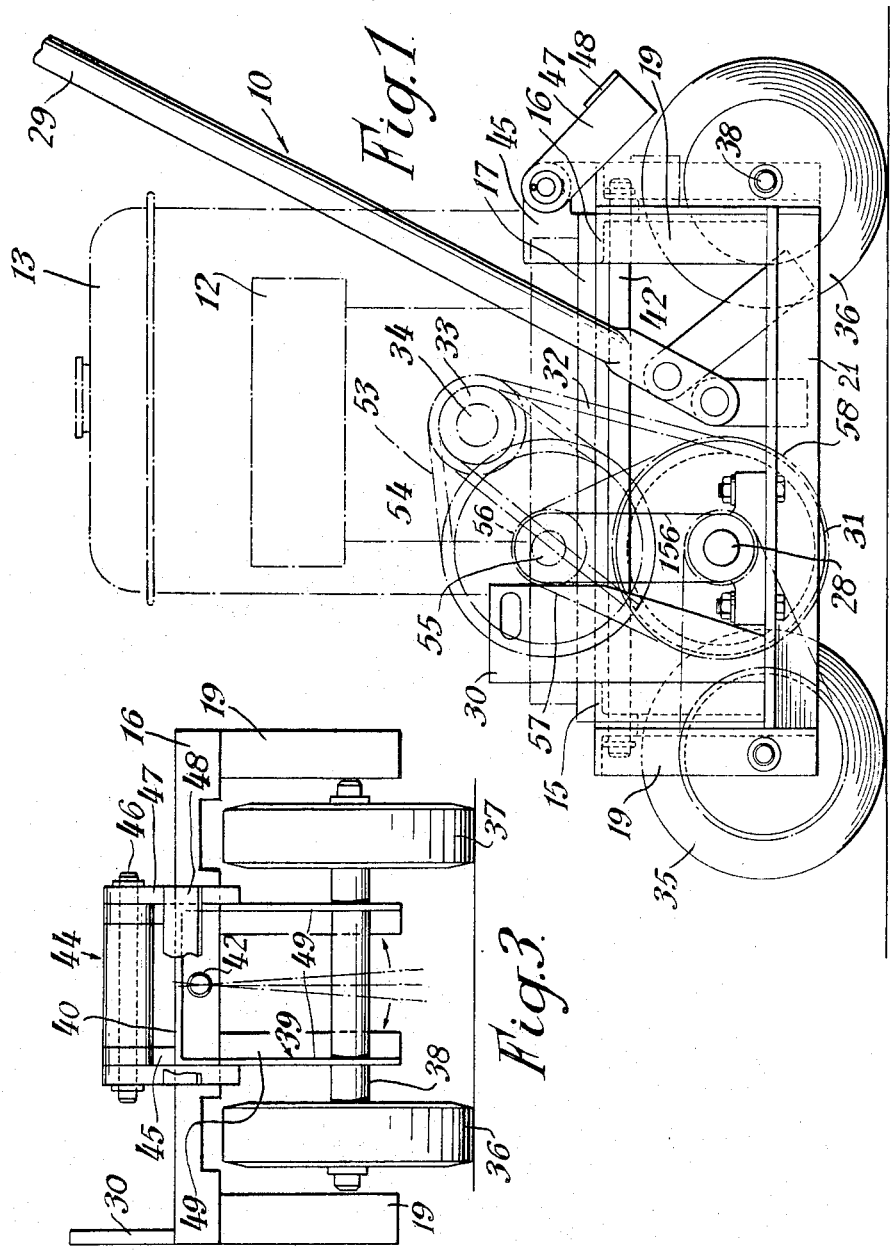

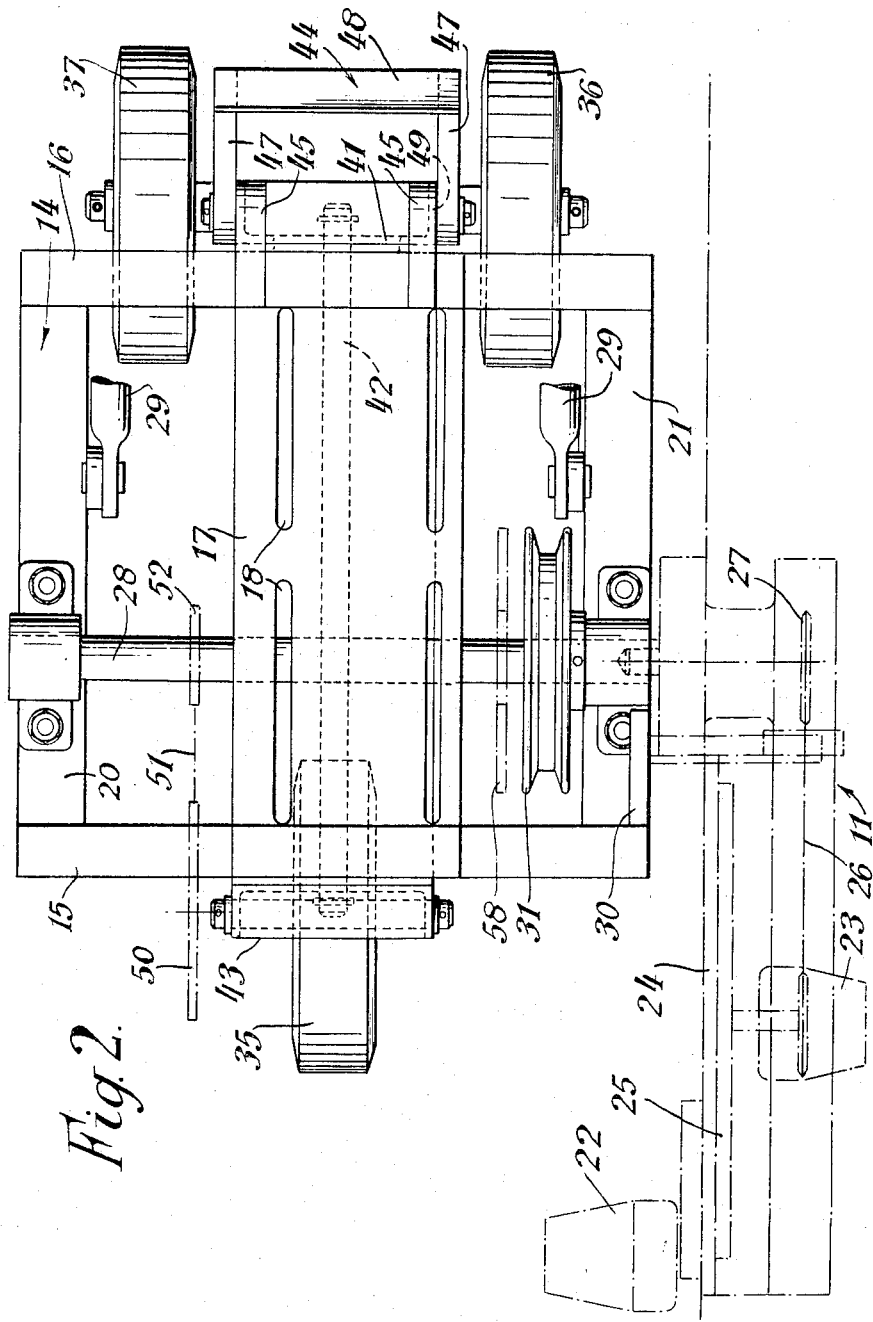

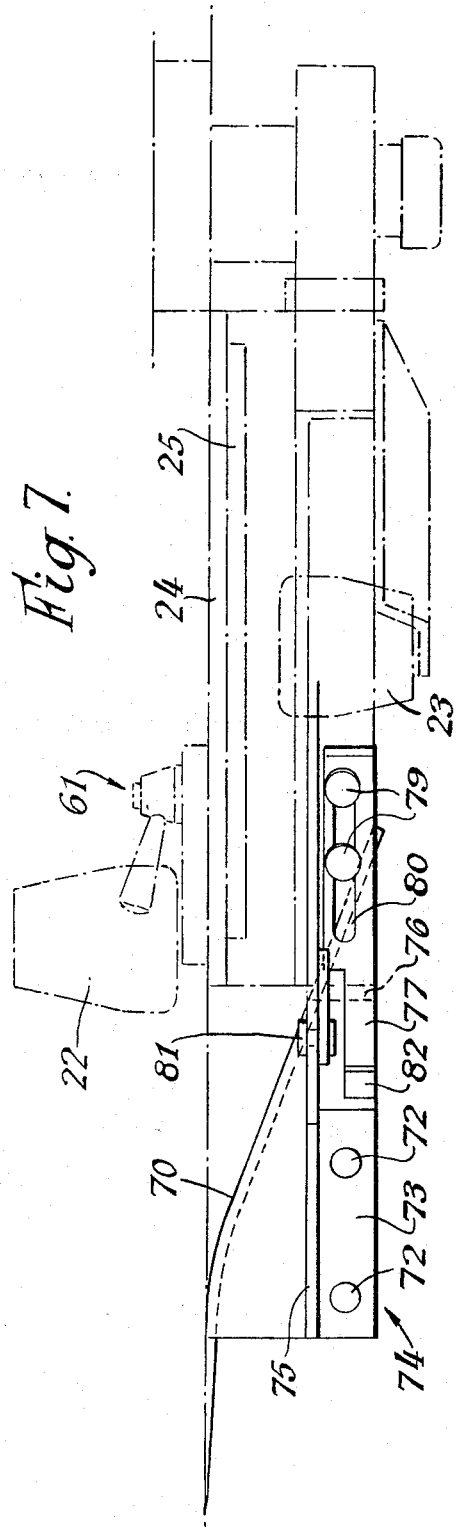
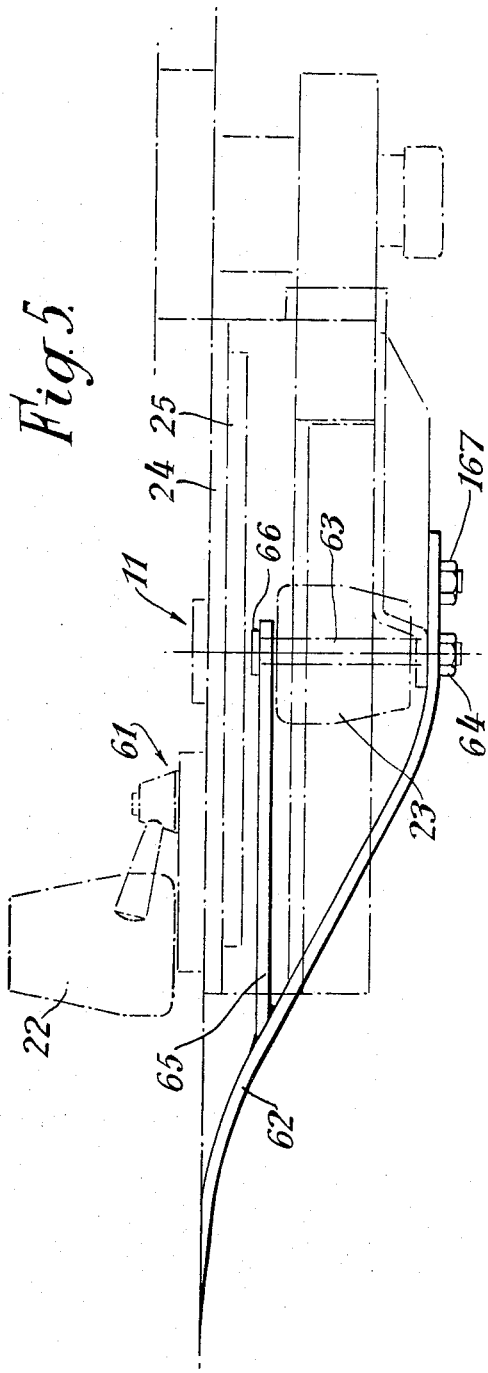

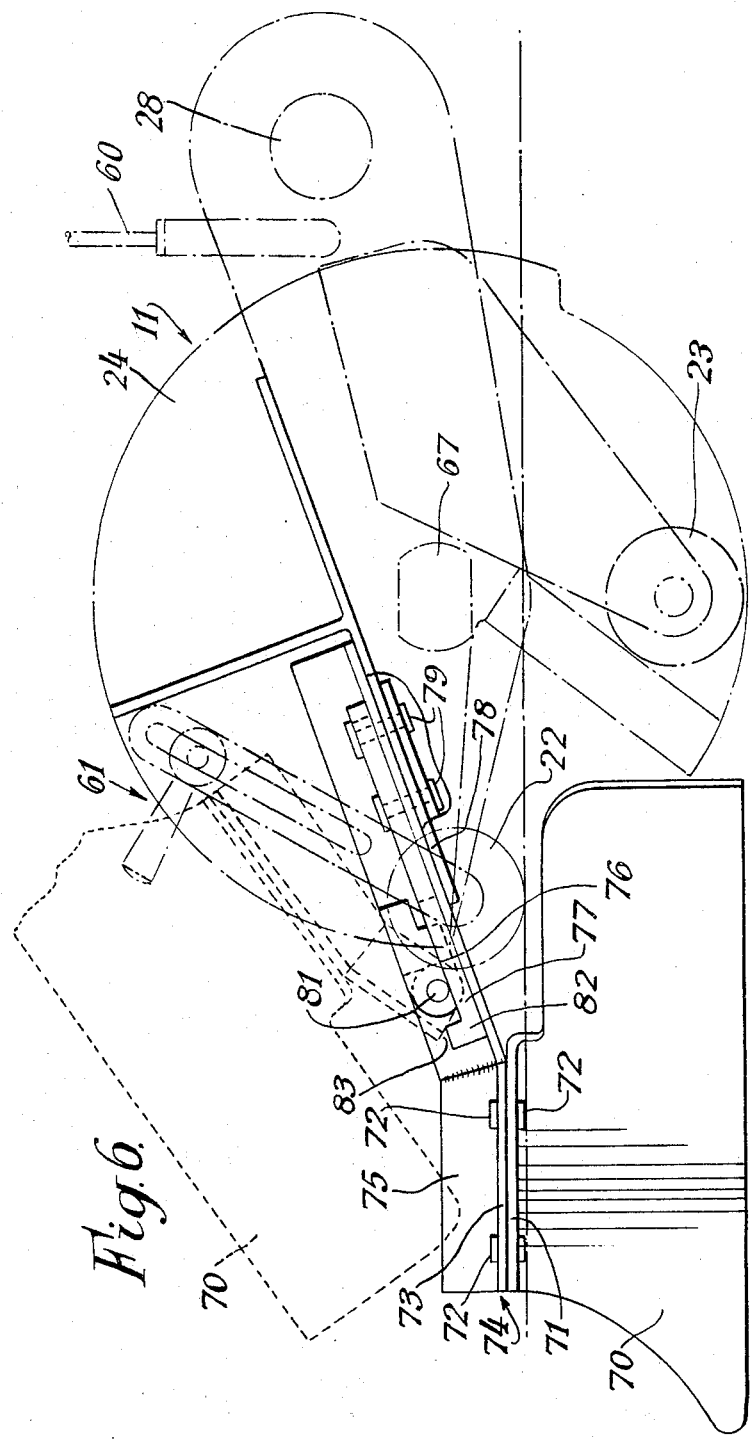

Inventor
Victor Taylor Legge.
By Stevens, Davis, Miller & Mosher
Attorneys

Nov. 15, 1966 V. T. LEGGE 3,285,348
CUTTING MACHINES, MORE PARTICULARLY
FOR TRIMMING THE EDGES OF LAWNS
Filed Aug. 24, 1964 7 Sheets-Sheet 7
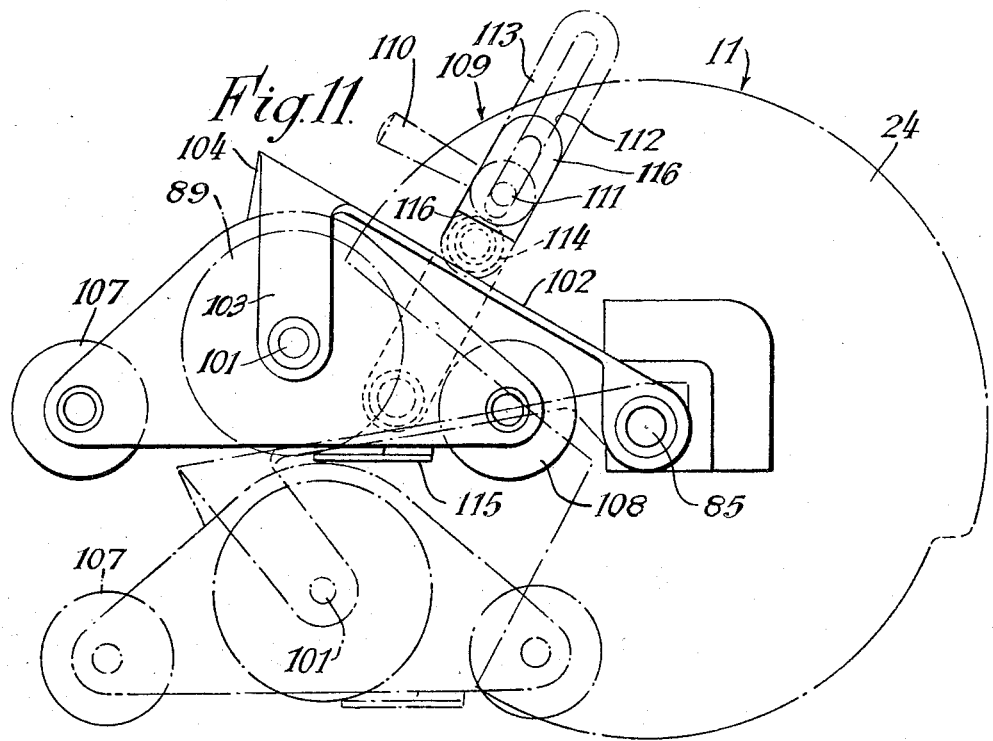
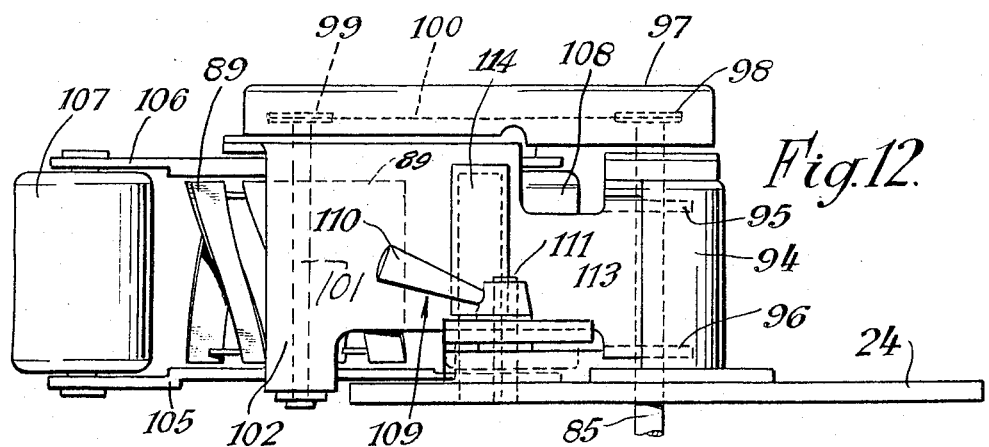
Inventor
Victor Taylor Legge
By Stevens, Davis, Miller & Mosher
Attorneys

United States Patent Office 3,285,348
Patented Nov. 15, 1966

3,285,348
CUTTING MACHINES, MORE PARTICULARLY FOR TRIMMING THE EDGES OF LAWNS
Victor Taylor Legge, 3 Blandford Road,
St. Albans, England
Filed Aug. 24, 1964, Ser. No. 391,403
8 Claims. (Cl. 172—14)

This invention relates to cutting machines for trimming the edge of a lawn and it is concerned primarily with the provision of a power operated lawn edge trimming machine which may be operated as a self-contained unit for trimming the edge of a grass area.

The main object of the invention is to provide a self-contained power operated lawn edge trimming machine which is capable of being propelled manually or by the power means. A further object of the invention is to provide an improved mechanism which permits the easy operation of the edge trimming device irrespective of the depth of the edge of the grass area. Yet a further object of the invention is to provide an improved trimming machine which is provided with a stone guard which may be adjustable so as to operate within a desired depth of soil. Yet a further object of the invention is to provide a trimming device for a self-contained edge trimming machine which simultaneously cuts both the horizontal and vertical surfaces at the lawn edge, so that the edge is trimmed neatly in one operation without the necessity of running a conventional lawn mower along the lawn edge in order to trim the horizontal surface after the vertical edge has been trimmed.

In its broadest aspect the invention provides a power operated cutting machine for trimming the edge of a lawn, said machine comprising a movable frame having wheels or rollers thereon, a power unit on said frame, and an edge trimming device which is pivotally mounted on the side frame of the machine for movement between an upper inoperative position and a lower operative position, said trimming device including a cutter assembly driven by said power unit. The power unit may comprise an electric motor or an internal combustion engine mounted on the frame of the machine, and the power unit is preferably connected with one or more of the wheels or rollers for propelling the said machine. In the preferred embodiment of the invention the wheels or rollers are mounted in suport members each pivotally attached to the frame so as to permit movement of the wheels relative to the said frame. This arrangement is particularly useful where the grass area has undulations transversely to the direction of movement of the cutting machine as it permits the wheels to follow the undulations without affecting the position of the frame and thereby the handles carried thereby. The relatively pivotal movement is preferably obtained by mounting the support members carrying the wheels on a shaft which extends centrally of the machine and longitudinally of the frame. One of the support members preferably comprises a sub-frame in which are mounted a pair of spaced wheels and the frame is pivotally mounted on the shaft but can be locked to prevent relative movement to the main frame of the machine by a locking device which is mounted on the main frame and which is pivoted into a locking position to engage the sub-frame and to hold it rigidly in position relative to the main frame of the machine.

According to a further feature of the invention the edge trimming device mounted on the frame of the cutting machine may be provided with a stone guard which is conveniently in the form of a plough or scraper device mounted in front of the cutter assembly of the edge trimming device. In one arrangement the plough or scraper device is fixedly mounted on a support roller on the casing of the trimmer device so that the plough or scraper device extends forwardly therefrom. In another embodiment the plough or scraper device is mounted on a support arm on the casing of the edge trimmer device and the support arm may be adjustable to permit the plough or scraper device to be positioned as desired relatively to the casing of the edge trimmer device. Preferably, the support arm is hinged and is retained in its operative or inoperative positions by a slidable member mounted on the support arm.

According to a further feature of the invention the edge trimming device of the cutting machine may be provided with an auxiliary, horizontal cutter assembly for cutting the horizontal surface of the grass area adjacent the lawn edge. In one embodiment the horizontal cutter assembly is drivably connected with the driving spindle for the cutter blades of the edge trimming device so that the blades of both assemblies operate simultaneously to trim the edge of the lawn neatly in one operation without the necessity of running a conventional lawn mower along the lawn edge after the vertical edge has been cut by the auxiliary trimming device. In another embodiment the auxiliary, horizontal cutter is carried by a pivoting or swinging arm or casing which is mounted about the spindle of the edge trimming device so as to permit the auxiliary, horizontal cutter to find its correct level irrespective of vertical movement of the edge trimming device. Preferably, the swinging arm or casing is movable between two stops on the casing of the edge trimming device and the upper stop is conveniently adjustable so as to provide a variable support for the edge trimming device.

Having now briefly described the invention the preferred embodiments will now be explained in detail with reference to the accompanying drawings, in which:

FIGURE 1 is a side elevation of a power operated lawn edge trimming machine which is operable as a self-contained unit for trimming the edge of a grass area, the edge trimming device being removed so as to show the construction features of the claim more clearly;

FIGURE 2 is a plan view of the cutting machine as shown in FIGURE 1 but with the power unit removed so as to show the constructional features of the frame more clearly;

FIGURE 3 is an end view of the cutting machine as shown in FIGURE 1 as seen from the right-hand side of the figure and also with the power unit removed;

FIGURE 5 is a plan view of the edge trimming device as shown in FIGURE 4;

FIGURE 6 is a view similar to FIGURE 4 showing a modified arrangement of stone guard fitted to the edge trimming device of the cutting machine;

FIGURE 7 is a plan view of the edge trimming device and stone guard as shown in FIGURE 6;

FIGURE 11 is a further embodiment of an edge trimming device having a short horizontal cutter which is mounted on a swinging arm pivoting about the spindle of the edge trimming device; and FIGURE 12 is a plan of the edge trimming device as shown in FIGURE 11.

Figure 4:
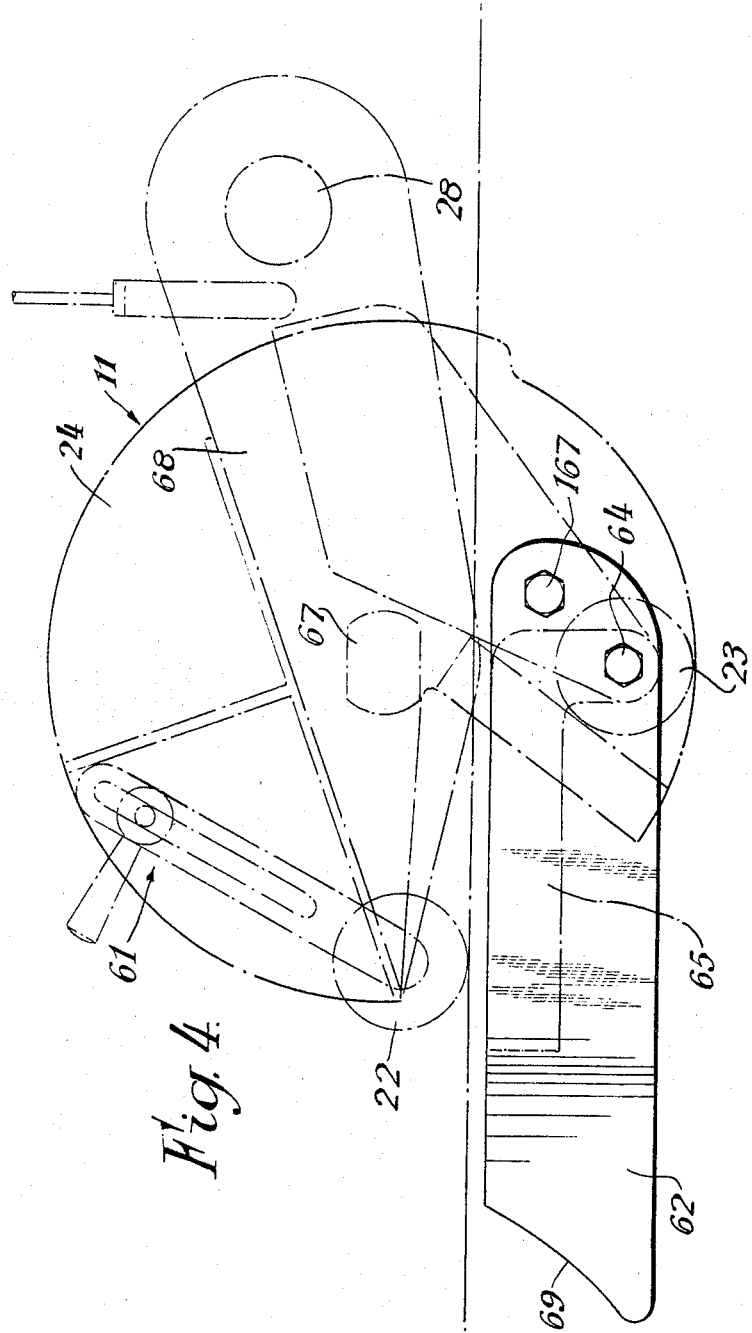
FIGURE 4 is an enlarged diagrammatic view showing the edge trimming device of the cutting machine fitted with a stone guard in the form of a plough or scraper device.

Referring now to FIGURES 1 to 3 of the drawings there is shown a cutting machine 10 in accordance with the invention which is intended for trimming the edge of a lawn. The cutting machine is self-contained and it is provided with an edge trimming device shown by the reference numeral 11 in FIGURE 2 and which is power operated by a power unit 12 mounted on the main frame of the machine. Any suitable form of power unit may be provided, such as an electric motor, but preferably an internal combustion engine is used and fuel is supplied from the tank 13 also mounted on the frame of the machine.

The frame of the machine is shown generally by the reference numeral 14 and it is built up from separate bars which are welded or otherwise secured together. The frame 14 comprises a pair of transverse bars 15 and 16 at each end of the machine and these bars support the top plate 17 which is formed with slits 18 as shown for the adjustment and correct positioning of the power unit 12.

Each of the ends of the transverse bars 15 and 16 are connected to short downwardly extending bars 19 which at their lower ends support bars 20 and 21 which extend longitudinally of the machine at a level which is substantially below that of the top plate 17.

The longitudinal bar 21 which, as shown, may be at the left-hand side of the machine as viewed by the operator pivotally supports the edge trimming device 11, which trimming device may be of any conventional form but which is preferably of the type described and claimed in my U.S. Patent No. 3,188,788. As explained in this patent the edge trimming device is pivotally movable from an upper inoperative position to a lower operative position which operative position may be determined by a stop on the frame of the machine or by a supporting device such as a roller 22 or 23 carried by the casing 24 of the edge trimming device. The cutter assembly 25 is driven by a chain 26 through a gear 27 which is rotated from the output shaft 28 also mounted on the longitudinal bar 21 of the machine.

The pivotal movement of the casing 24 of the edge trimming device is obtained manually preferably through cable means mounted on the upper part of the handle 29 which, as shown, is also connected in a conventional manner at its lower end to the longitudinal bars 20 and 21. The cable (not shown) is supported by the plate 30 which is secured to and extends upwardly from the longitudinal bar 21.

As previously mentioned the edge trimming device 11 is preferably coupled to the output shaft 28 of the machine and the arrangement is such that the trimming device is pivotally movable about the shaft 28, or an extension thereof. The shaft 28 is provided with a pulley 31 which is drivably connected with the power unit 12 by means of the belt 32 which engages the pulley 33 on the output shaft 34 of the power unit 12.

The arrangement is such that the machine is completely self-contained and it provides a power operated edge trimming device the position of which can be determined by manual control of the operator from the handle of the machine.

As explained the machine is manually movable and will have to be pushed by the operator and to this end it is provided with land wheels (or rollers). In the arrangement shown in FIGURES 1 to 3 the machine is provided with a front wheel 35 and a pair of rear wheels 36 and 37. As shown in FIGURE 3 of the drawings the rear wheels 36 and 37 are spaced apart between the bars 19 and they are mounted on an axle 38 which is supported by a sub-frame 39. The frame 39 is of inverted U construction as shown quite clearly in FIGURE 3 but the top portion 40 is formed with a flat plate section 41 by which the frame is pivotally mounted on a central shaft 42 which extends longitudinally along the length of the machine. The arrangement is such that the frame 39 is mounted on the shaft 42 for complete pivotal movement so that the wheels 36 and 37 can move relatively to the main frame 14 of the machine. This permits the frame 14 to remain substantially horizontal even though the wheels 36 and 37 will follow undulations which are transverse to the direction of movement of the machine. This is an important feature of the invention as it means that the operator does not have to tilt the machine (which requires considerable effort) so as to maintain the blades 25 upright with respect to the edge of the lawn.

The front wheel 35 is also carried by a U-shaped support frame 43 also mounted on the front end of the shaft 42. The arrangement is similar to the frame 39 as shown in detail in FIGURE 3. The frames 39 and 43 may be connected together by longitudinal bars for pivotal movement relative to shaft 42 which is fixed in frame 14; alternatively the frames may be fixedly secured to shaft 42 which pivots in frame 14.

In order to prevent the relative pivotal movement described above a locking device is provided shown generally by the reference numeral 44. This locking device comprises a pair of lugs 45 extending upwardly from the rear bar 16 of the machine and which support a cross shaft 46 on which is mounted a pair of arms 47 connected at their outer ends by a cross bar 48. The assembly formed by the arms 47 and the connecting bar 48 is thereby pivotable about the shaft 46 and the arms 47 are so positioned that they slide snugly against the outer sides 49 of the frame 39 supporting the wheels 36 and 37. In its lowered position the locking device 44, as shown in chain lines in FIGURE 1, engages the sides 49 of the frame 39 with the bar 48 against the front edges. In this position relative movement between the frame 39 and the frame 14 is prevented.

As a modification of the cutting machine mentioned above it is possible also to operate the machine as a completely power driven mechanism. In this connection the front wheel 35 is driven from the power unit 12 through a reduction gearing. The arrangement is shown in chain lines in FIGURES 1 and 2 of the drawings and it will be seen that it includes a driving sprocket 50 coupled with the front wheel 35 in any conventional manner and which is driven by the chain 51 from a sprocket 52 mounted on shaft 28. The sprocket 52 is mounted on the transverse shaft 28 and this shaft is now driven by the power unit 12 by means of a belt 53 which drivably engages a pulley 54 on a shaft 55 which extends across the machine above the top plate 17 and is supported at either end by upstanding arms 156. The shaft 55 is drivably connected with the shaft 28 by means of a small sprocket 56 on the shaft 55 which is connected by a chain 57 with a large sprocket 58 on the lower shaft 28.

In the modified arrangement mentioned above the wheel 35 is fixed with relation to the frame 14 of the machine and may be located at the front or rear of the machine. In either case, it will of course be understood that there is no necessity to provide the shaft 42 extending longitudinally the full length of the frame 14. In such an arrangement a short shaft can be provided extending through the bar 15 or 16 at the front or end of the machine and the shaft can then be secured in position by means of the washer and pin as shown for each end of the shaft in FIGURE 2 of the drawings.

Referring now to FIGURES 4 and 5 of the drawings there is shown a modified form of the edge trimming device 11 in which a stone guard is provided and which projects at an angle ahead of the cutter blades 25 in order to ward off stones from the vicinity of the cutter just above the level of the earth. The general construction of the edge trimming device 11 has already been described and claimed in my aforementioned patent to which reference should be made for further information regarding the construction and operation of parts.

As shown the edge trimmer device is pivotally supported on the shaft 28 and is manually controlled through the cable 60 under the control of the operator on the handle 29. The lowermost position of the cutter is determined by the roller 22, the position of which is adjustable by the device 61 mounted on the casing 24, or by the lower roller 23 which is mounted on the lower part of the casing.

In the embodiment shown in FIGURES 4 and 5 of the drawings the stone guard comprises a plough or scraper device 62 which is in the form of a piece of metal bent at an angle and which is attached to the casing 24 of the edge trimmer device on the spindle 63 of the roller 23 on which it is retained by the nut 64. The spindle 63 is headed and an extension 65 of the plough or scraper 22 extends beneath the casing and is secured in position on the spindle 63 at the other side of the roller 23 by the head portion 66. The plough or scraper device 62 is maintained in position by a further connecting member 167 which also engages with the casing 24.

The cutter spindle is shown by the reference 67 and is rotated by a sprocket chain drive from the shaft 28 which is located within the section 68 of the casing.

The front portion 69 of the plough or scraper device 62 is suitably shaped to dig away the soil at the edge of the lawn prior to the engagement of the cutter assembly with the edge to be trimmed. In order to obtain a satisfactory cut it is necessary to have a suitable depth of edge on the grass area and for satisfactory operation a depth of edge of about 2 to 3 inches is generally required and if such a depth is not available it is generally necessary to dig the soil away prior to using the edge trimming device. The provision of the plough or scraper device 62 provides the necessary digging action so that the edge trimming device 11 can operate satisfactorily.

Referring now to FIGURES 6 and 7 of the drawings there is shown a modified arrangement of a plough or scraper device which is mounted on the vertical guiding plate on the front support arm of the edge trimmer. Referring to the drawings the plough or scraper device 70 is suitably designed as before and is formed with an upper flange 71 which is connected by bolts 72 to a flange 73 which forms part of the vertical guiding plate 74 provided on the front support arm of the edge trimmer 11. The vertical guiding plate 74 is formed with an upstanding flange 75 and it extends rearwardly from its connection with the flange 71 of the plough or scraper device 70 along the casing 24 to which it is connected.

The plate 74 is hinged at 76 so that the front portion of the plate can be moved upwardly into the position shown in chain lines in FIGURE 6 so as to move the plough or scraper device 70 to an inoperative position. In the lowered or operative position of the plough or scraper device 70 the guide plate 74 is maintained in its position as shown in FIGURE 6 of the drawing in full lines by means of a locking member 77 which is slidably mounted on the face of the inclined portion 78 of the plate 74. The plate 78 is provided with a pair of projecting guide bolts 79 which extend upwardly and engage within a slot 80 in the locking member 77. The arrangement is such that the front end of the locking member 77 moves downwardly into the position as shown in the plan view of FIGURE 7 of the drawings so that the locking member extends across the hinge 76 to prevent pivotal movement of the plough or scraper device 70 to its inoperative position about the pivot axis 81.

In order to move the plough or scraper device to its inoperative or raised position it is necessary to move the locking member upwardly so that the members 79 move within the slot 80 and when the locking member has reached its uppermost position the plough or scraper device can be pivoted to the inoperative position as shown in chain lines in FIGURE 6. The subsequent release of the locking bar 77 allows the bar to move downwardly until a toe portion 82 engages beneath the end 83 of the pivotal portion of the guide plate 74. The locking bar now acts to hold the plough or scraper device 70 in its raised or inoperative position and the operator must subsequently again manually move the locking bar 77 upwardly before the plough or scraper device 70 can be released to allow it to be moved to its operative position as shown in full lines in FIGURE 6.

Figure 8:
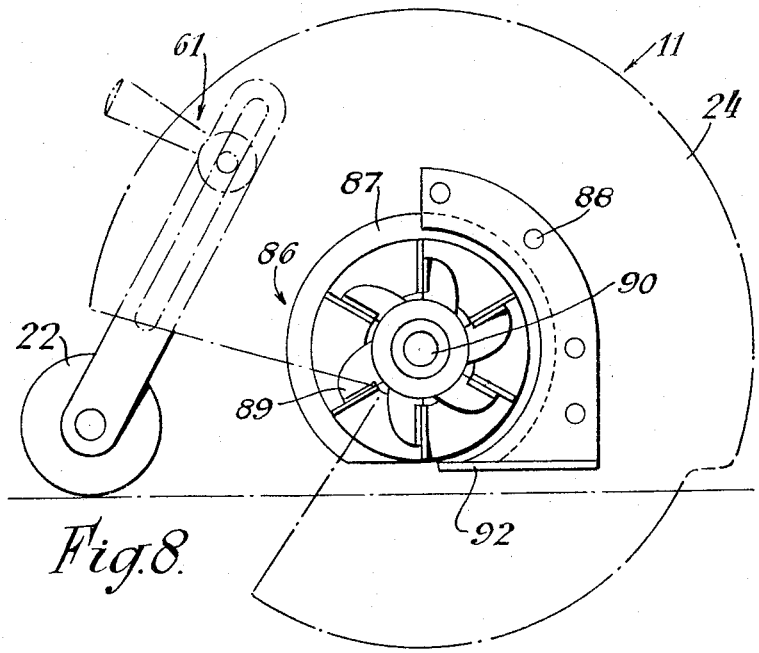
FIGURE 8 is a diagrammatic view of a portion of the edge trimming device of the cutting machine showing the provision of a small horizontal cutter for simultaneously trimming the horizontal surfaces of the grass area adjacent the lawn edge.
Figure 9:
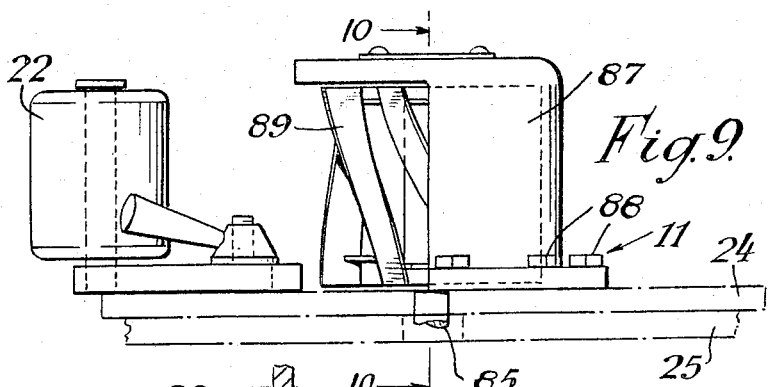
FIGURE 9 is a plan view of the cutter assemblies as shown in FIGURE 8.
Figure 10:
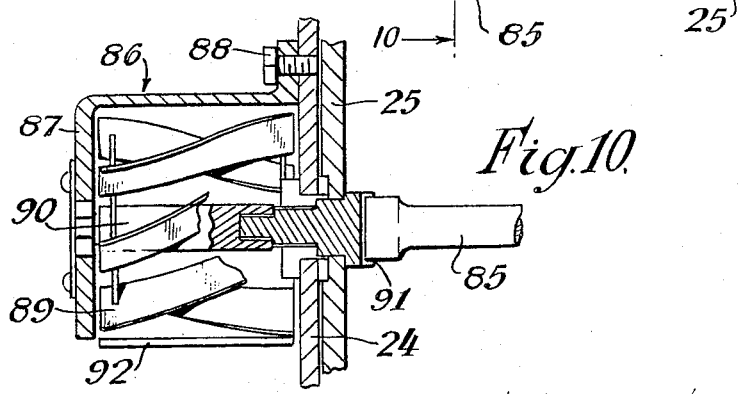
FIGURE 10 is a sectional view through the short horizontal cutter assembly of FIGURE 9 showing the driving connection with the spindle of the edge trimming device.

Referring now to FIGURES 8 to 10 of the drawings there is shown a modified form of edge trimming device which is operable for simultaneously cutting both the horizontal and vertical surfaces of the edge of the lawn surface. As shown the edge trimming device 11 is mounted with its casing 24 supported in the lowermost operative position by the support roller 22 which is adjustably mounted on the casing by means of the adjustable connection 61. The vertical cutter assembly 25 is driven by the spindle 85 and this spindle extends through the casing 24 and is drivably connected directly with a further small cylindrical cutter which is mounted horizontally on the inner surface of the casing 24. The small horizontal cutter is shown generally by the reference 86 and it comprises a housing 87 which is connected to the casing 24 by means of the bolts 88. The cutter includes a conventional horizontal cutter assembly 89 mounted on the spindle 90 which is drivably coupled with the shaft 85 of the vertical cutter by means of the coupling 91. As shown, particularly in FIGURES 8 and 9 of the drawings, the housing 87 extends partially around the cutter assembly 89 and is formed at a lower part of its periphery with the usual ledger blade 92.

Referring now to FIGURES 11 and 12 of the drawings there is shown yet a further modified arrangement of an edge trimming device in which the short horizontal cylindrical cutter is mounted on a pivoting or swinging arm about the spindle 85 of the vertical edge trimmer. The arrangement thus permits the cylindrical cutter to find its correct level irrespective of any vertical movement of the vertical trimming device 11. It will, of course, be appreciated that the vertical trimmer device 11 will, in fact, vary its vertical position in accordance with changes in the height of the lawn edge and the present modification is provided so that any movement of the vertical trimmer 11 will not raise or lower the horizontal cutter assembly which otherwise would become ineffective to cut the horizontal grass surface.

In the drawings the shaft 85 of the vertical cutter assembly 11 extends through the casing 24 and into the casing 94 which is fixed to casing 24. Casing 102 is pivotally mounted at 95 and 96 on the spindle 85 so that the casing 102 is movable relatively to the casing 24.

The spindle 85 extends into the drive casing 97 and is provided with a sprocket 98 which is drivably connected with a sprocket 99 through a chain 100, the sprocket 99 being mounted on the spindle 101 of the horizontal cutter assembly 89.

Casing 102 acts as a swinging arm and is provided at its outer end with arm portions 103 and 104 which rotatably support the cutter shaft 101. The horizontal cutter 89 is mounted between a pair of triangular plates 105, 106 which at their ends are provided with support rollers 107, 108. The plates 106, 105 are also provided with the usual ledger blade 115.

The casing 24 of the auxiliary edge trimmer 11 supports an adjustable device 109 which comprises a locking handle 110 mounted on a pin 111 which extends through a slot 112 in a member 113 fixedly secured to a stop 114 welded to the upper surface of the swinging arm 102. The arrangement is such that the movement of the swinging arm 102 from its uppermost position as shown in full lines in FIGURE 11 to its lowermost position as shown in chain lines is determined by the engagement of the ends of the slots 112 with the pin 111. The lowermost stop as provided by the top of the slot 112 suports the cutter assembly in the inoperative position of the casing of the main trimmer 11, while the uppermost stop is provided so that when the assembly abuts the bottom of the slot 112 the cylindrical cutter will act as a support for the trimmer so that the usual support roller may not be needed. The stop device 109 is made adjustable by providing a second, shorter slotted member 116 which is mounted on pin 111 and separated from slotted member 113 by a flange on the pin 111. The lower end of member 116 is straight for engagement by stop 114 and the position of the slotted member 116 is adjustable as desired.

The invention thus provides a completely power operated edge trimming device which may be mechanically propelled by the power unit if desired. Furthermore, the edge trimming device may be provided with a digging plough or stone guard while a horizontal cutter assembly may be provided to ensure that the lawn edge is given a square cut irrespective of undulations in the grass surface so as to give a square cut on the edge of the lawn without the necessity of using a conventional lawn mower to cut the edge surface.

I claim:

1. A lawn cutting machine comprising a main frame, a main driving shaft mounted on said frame, power means mounted on said frame for driving said shaft, at least one support frame pivotally mounted on said main frame, a vertical cutter assembly connected to and driven by said shaft, said assembly extending externally of said main frame and being pivotable between an upper inoperative position and a lower operative position about said shaft, a horizontal cutter asssembly pivotally mounted on said vertical cutter assembly so as to permit the horizontal cutter assembly to find its correct level irrespective of vertical movements of the vertical cutter assembly, and at least one rolling member rotatably mounted on said support frame and on each of said cutter assemblies.

2. The machine of claim 1 further comprising means to lock said horizontal cutter assembly with respect to said vertical cutter assembly.

3. The machine of claim 1 further comprising means to regulate the pivotable movement of said horizontal cutter with respect to said vertical cutter assembly.

4. The machine of claim 1 wherein there are a pair of spaced rolling members mounted at the rear of said support frame and a single rolling member mounted at the front thereof.

5. The machine of claim 1 wherein said support frame is substantially U-shaped, and further comprising means for locking said support frame with respect to said main frame.

6. The machine of claim 1 wherein said power means is drivably coupled to at least one of said rolling members on said support frame for driving said machine.

7. A lawn cutting machine comprising a main frame, a main driving shaft mounted on said frame, power means mounted on said frame for driving said shaft, at least one support frame pivotally mounted on said main frame, a vertical cutter assembly connected and driven by said shaft, said assembly extending externally of said main frame and being pivotable between an upper inoperative position and a lower operative position about said shaft, an elongated plough member mounted on said vertical cutter assembly and pivotable with respect thereto between an operative position in which at least a portion of said plough extends forward of said cutter assembly and an inoperative position in which said plough rests on said cutter assembly, and at least one rolling member rotatably mounted on said support frame and said cutter assembly.

8. The machine of claim 7 further comprising means to lock said plough member in said operative and inoperative positions.

References Cited by the Examiner

UNITED STATES PATENTS

| | | | |
|---|---|---|---|
| 1,970,827 | 8/1934 | Van Kesteren | 172—16 X |
| 2,039,029 | 4/1936 | Pond | 56—251 |
| 2,739,437 | 3/1956 | True | 56—256 X |
| 2,741,890 | 5/1956 | Woody | 280—111 X |
| 2,931,156 | 4/1960 | Fuldwider | 280—111 X |
| 3,018,599 | 1/1962 | Rambo | 56—251 X |
| 3,019,585 | 2/1962 | Wellborn | 56—256 X |
| 3,079,743 | 3/1963 | Egley | 172—15 X |
| 3,130,793 | 4/1964 | Allegretti | 172—15 X |
| 3,171,497 | 2/1965 | Haigh | 175—15 |

ABRAHAM G. STONE, *Primary Examiner.*

R. L. HOLLISTER, F. B. HENRY, *Assistant Examiners.*